United States Patent [19]
Hohmann et al.

[11] Patent Number: 5,299,474
[45] Date of Patent: Apr. 5, 1994

[54] TAMPER RESISTANT DEVICE FOR THE APPLICATION OF PRESELECTED TORQUE TO SCREWS AND THE LIKE

[75] Inventors: Ralf Hohmann; Ralf Spors, both of Bruchköbel; Gerhard Winterstein, Bad Vilbel; Heinz Sauer, Ronneburg, all of Fed. Rep. of Germany

[73] Assignee: Rasmussen GmbH, Maintal, Fed. Rep. of Germany

[21] Appl. No.: 35,745

[22] Filed: Mar. 23, 1993

[30] Foreign Application Priority Data
Apr. 3, 1992 [DE] Fed. Rep. of Germany ....... 4211132

[51] Int. Cl.$^5$ .......................................... B25B 23/153
[52] U.S. Cl. .................................. 81/471; 81/467
[58] Field of Search .................. 81/471, 467; 411/5, 411/3, 2, 377

[56] References Cited

U.S. PATENT DOCUMENTS

| 3,331,267 | 7/1967 | Tietge | 81/471 |
|---|---|---|---|
| 3,595,124 | 7/1971 | Lindstrand | 411/2 |
| 4,037,515 | 7/1977 | Kesselman . | |
| 4,948,319 | 8/1990 | Day et al. | 411/377 |
| 5,176,050 | 1/1993 | Sauer . | |

FOREIGN PATENT DOCUMENTS

| 1134252 | 8/1962 | Fed. Rep. of Germany . |
|---|---|---|
| 9011571 | 2/1991 | Fed. Rep. of Germany . |
| WO-A-9203261 | 3/1992 | France . |
| EP-A-0-121-943 | 10/1984 | European Pat. Off. . |
| GB-A-2140523 | 11/1984 | United Kingdom . |

Primary Examiner—Robert C. Watson
Attorney, Agent, or Firm—Darby & Darby

[57] ABSTRACT

A screw can be driven home in response to the application of a preselected torque by placing over the head of the screw a tubular first section of a plastic adapter wherein the first section is connected with a polygonal second section by a frangible joint. The joint breaks in response to the application of preselected torque to the second section, and the separated second section then exposes a destructible diaphragm which is provided in the first section and overlies the head of the screw. The head can be engaged by the working end of a tool in response to at least partial destruction of the diaphragm. The first section can be of one piece with the head or it can be affixed thereto by an adhesive or is in mere frictional engagement with the head. Integrity and accessibility of the diaphragm indicate that the screw was driven home in response to the application of preselected torque as well as that the head of the screw was not tampered with subsequent to separation of the second section from the first section of the adapter.

11 Claims, 1 Drawing Sheet

U.S. Patent
Apr. 5, 1994
5,299,474
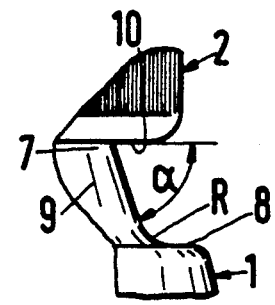
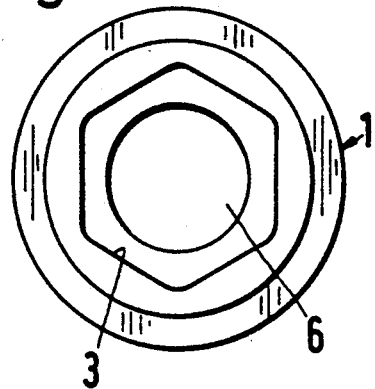
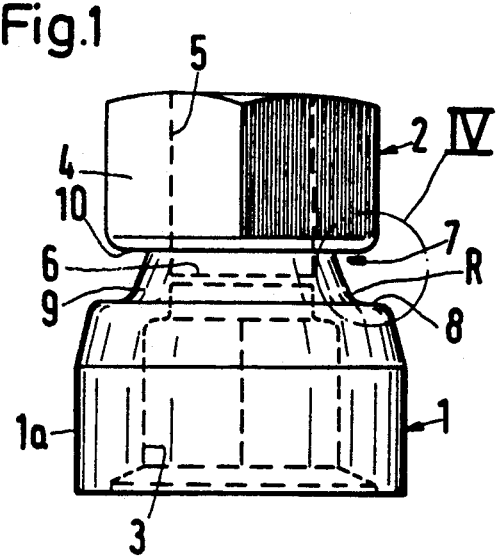
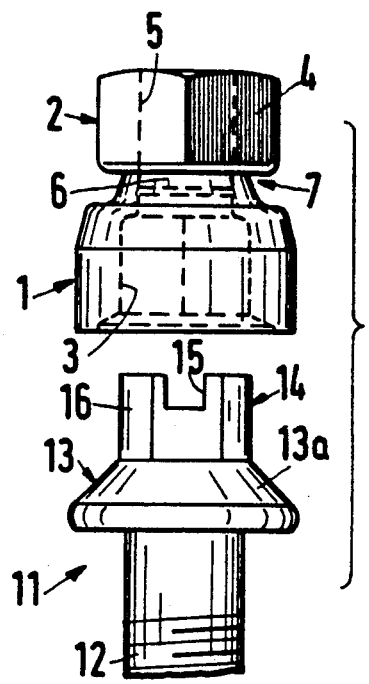
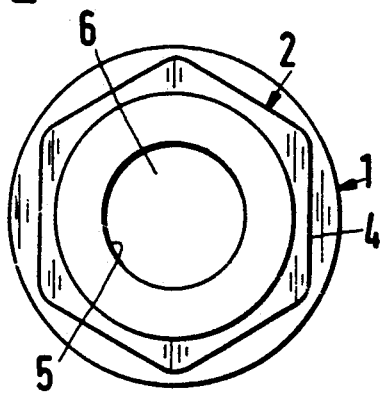
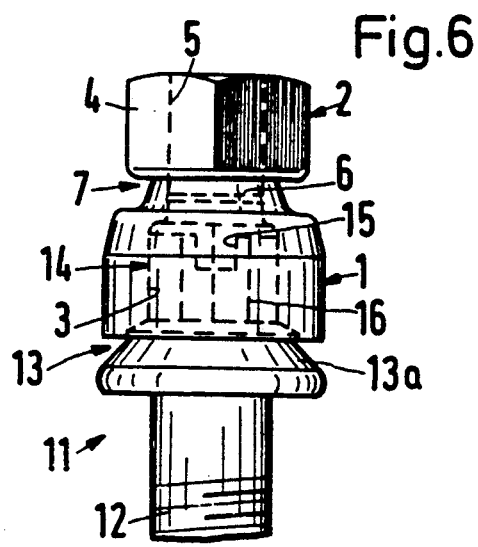

TAMPER RESISTANT DEVICE FOR THE APPLICATION OF PRESELECTED TORQUE TO SCREWS AND THE LIKE

BACKGROUND OF THE INVENTION

The invention relates to improvements in devices for the application of preselected torque to rotary parts, particularly to screws, nuts, bolts and other externally or internally threaded fasteners. For example, devices of the type to which the present invention pertains can be utilized with advantage for the application of a preselected torque to tightening screws in hose clamps and the like.

It is already known to provide a device which can be applied to the head of a screw or another threaded fastener and can be rotated by a wrench, by a screw driver or by another suitable tool in order to rotate the fastener until the fastener begins to offer a preselected resistance to further rotation. Reference may be had, for example, to commonly owned U.S. Pat. No. 5,176,050 granted Jan. 5, 1993 to Heinz Sauer for "Tool for the application of predetermined torque to bolts, nuts and the like." The device of Sauer comprises a first section which can be permanently affixed to the head of a screw and a second section which becomes separated from the first section in response to the application of a preselected torque by a wrench or by another suitable tool, namely when the screw begins to offer a predetermined resistance to further rotation. Separation of the second portion from the first portion of the device which is disclosed by Sauer et al. constitutes evidence that the screw was driven home in response to the application of a preselected torque, namely a torque which was necessary to separate the second section from the first section. However, an unauthorized person is not prevented from rotating the screw in a direction to drive the screw deeper into one or more objects or to loosen the screw. In other words, the device of Sauer can furnish evidence that a preselected force was indeed applied to drive the nut home but such device cannot indicate whether or not the screw has been tampered with subsequent to separation of the second section from the first section. As a rule, the head of the screw has a polygonal or otherwise configurated internal surface which can be engaged by the working end of a suitable tool (such as a screw driver or a tool having a polygonal working end insertable into a complementary socket in the head of a screw) to be rotated subsequent to separation of the second section from the first section of the device which is disclosed by Sauer et al. Furthermore, and since the first section is non-rotatably secured to the head of the screw, and if such first section is provided with a polygonal, oval or other non-circular external surface, the screw can be driven deeper into one or more objects or can be loosened by a tool which is used to engage the external surface and to thereupon rotate the first section of the device subsequent to separation of the second section.

If the device of Sauer is utilized in a motor vehicle and a screw or another rotary part is either loosened or driven home with an excessive force, the maker of the vehicle or a person in charge of repairing the vehicle can prove that, by having utilized the device of Sauer, the rotary part was driven home in response to the application of a prescribed (preselected) torque. However, this does not suffice to relieve the maker or the repairman of responsibility for loosening or excessive application of the rotary part subsequent to the application of a preselected torque with the device of Sauer. This can result in a controversy and the maker of the vehicle and/or the person in charge of repairing the vehicle might be liable for damages to and for repair of the vehicle under an existing warranty or at such person's own expense.

German Auslegeschrift No. 1 134 252 of Heil (published Aug. 2, 1962) discloses a screw with two coaxial heads which are disposed end-to-end and one of which is of one piece with the externally threaded shank of the screw. The other head becomes separated from the one head in response to the application of a preselected torque by a screw driver or an analogous tool. The one head is confined in a socket which is installed in one of the objects to be connected to each other by the shank of the properly applied screw, and the socket is thereupon filled, e.g., with an insert consisting of lead, when the separation of the other head is completed. Absence of the insert or visible damage to the insert constitutes evidence that the device has been tampered with subsequent to separation of the other head from the one head and subsequent to filling of the socket with an insert of lead. The one head is devoid of slots or like configurations which would permit engagement by a screw driver, by a wrench or by any other suitable tool for the purpose of loosening or withdrawing the screw subsequent to removal of the insert from its socket. Therefore, the inventor proposes to form slots in the one head after removal of the insert so that the thus shaped one head can be engaged by a suitable implement and loosened or withdrawn from the part or parts which receive the shank of the screw. A drawback of the device of Heil is that the twin-headed screw is not a standard screw, that the device must employ an accurately machined or otherwise finished socket, that the application of an insert of lead takes up much time, that the removal of the insert takes up much time, and that the one head must be treated subsequent to removal of the insert in order to permit engagement of the one head by a suitable tool which is to loosen or remove the screw.

German Utility Model No. 90 11 571.6 of Petri (published Feb. 14, 1991) discloses a device wherein one end face of a headless screw is provided with a polygonal recess. The one end face is of one piece with one axial end of a tubular neck section which, in turn, is of one piece with a hexagonal second section. The aligned axial passages of the two sections contain a mass of compacted steel wool, felt, foamed plastic or the like in order to prevent access to the recess of the screw while the latter is still of one piece with the two sections. These sections can be separated from the screw at the end face in response to the application of a preselected torque, and this immediately affords access to the recess in the end face of the screw, i.e., the screw can be tampered with subsequent to the application of a preselected torque as evidenced by separation of the two sections from the end face of the screw. Thus, the device of Petri also fails to prevent tampering with a rotary part subsequent to the application of a preselected torque.

U.S. Pat. No. 4,037,515 granted Jul. 26, 1977 to Kesselman discloses a tamper resistant fastener wherein a stud engaging portion of steel can be applied over an externally threaded stud and becomes separated from a hexagonal wrench engaging portion in response to the application of a preselected torque to the hexagonal portion. The stud engaging portion is surrounded by a slip ring which is freely rotatable thereon and has a cylindrical external surface so that it cannot be rotated by a standard wrench or by a like implement. The narrow clearance between the slip ring and the stud can be overlapped by a flange of the slip ring to thus prevent the insertion of a jamming tool between the split ring and the stud. A drawback of the patented fastener is that the stud cannot be readily rotated once the hexagonal portion is broken off the stud engaging portion, and that the slip ring must be machined or otherwise treated and installed with a high degree of accuracy.

OBJECTS OF THE INVENTION

An object of the invention is to provide a device which prevents and/or indicates unauthorized tampering with a rotary part subsequent to the application of a preselected torque to such rotary part.

Another object of the invention is to provide a device which reliably indicates whether or not the rotary part has been tampered with subsequent to the application of a preselected torque.

A further object of the invention is to provide a novel and improved adapter which can be used to apply preselected torque to nuts, screws or other threaded fasteners.

An additional object of the invention is to provide an adapter which can be used for the application of preselected torque to standard screws or to other rotary fasteners.

Still another object of the invention is to provide the adapter with novel and improved means for preventing immediate access to the rotary part subsequent to completed application of a preselected torque.

A further object of the invention is to provide a simple and compact adapter which can be mass produced from available materials.

Another object of the invention is to provide a novel and improved method of applying a preselected torque to externally threaded screws or other rotary fasteners.

An additional object of the invention is to provide a novel and improved combination of a rotary part and an adapter of the above outlined character.

Still another object of the invention is to provide an adapter which ceased to transmit torque at the exact instant when the rotary part has been acted upon with a preselected torque.

A further object of the invention is to provide an adapter which can be manipulated by available tools.

Another object of the invention is to provide a novel and improved method of concealing the rotary object upon completed application of a preselected torque.

An additional object of the invention is to provide an adapter which is designed to indicate, at a glance, whether or not the part which has received a preselected torque has been tampered with subsequent to the application of such torque.

SUMMARY OF THE INVENTION

The invention resides in the provision of a device which can be used to apply a preselected torque to a rotary part having an end portion with an internal surface engageable by a torque transmitting tool. The improved device comprises or constitutes an adapter including a tubular first section non-rotatably surrounding the end portion and having an external surface devoid of any disengaging tool accommodating means, a second section which is adjacent the first section and has at least one surface engageable by a torque transmitting tool, a joint which connects the sections and permits separation of the sections from each other in response to the application of the preselected torque to the second section, and a destructible barrier in the first section between the end portion and the joint.

The rotary part can be externally threaded and the barrier can include a diaphragm which is penetratable by an implement (such as a wrench or a screw driver) to afford access to the internal surface of the end portion of the rotary part.

The joint can be of one piece with the two sections of the adapter.

The adapter can be provided with an external groove which surrounds the joint and is bounded by mutually inclined external surfaces of the two sections. Such mutually inclined surfaces can make an acute angle.

The first section can be of one piece with the end portion of the rotary part. Alternatively, the first section can be bonded to the end portion of the rotary part or it can be in frictional engagement with the end portion.

The barrier is or can be of one piece with the first section of the adapter. The latter can be made (either entirely or in part) of a plastic material.

The at least one surface of the second section of the improved adapter can be a polygonal (e.g., hexagonal) external surface.

The external surface of the first section can be a cylindrical surface.

The novel features which are considered as characteristic of the invention are set forth in particular in the appended claims. The improved device itself, however, both as to its construction and the mode of using the same, together with additional features and advantages thereof, will be best understood upon perusal of the following detailed description of certain presently preferred specific embodiments with reference to the accompanying drawings.

BRIEF DESCRIPTION OF THE DRAWINGS

FIG. 1 is a side elevational view of an adapter which embodies the invention;

FIG. 2 is a top plan view of the adapter;

FIG. 3 is a bottom plan view of the adapter;

FIG. 4 is an enlarged view of a detail within the phantom-line circle IV in FIG. 1;

FIG. 5 illustrates the adapter of FIG. 1 and a rotary part prior to attachment of the first section of the adapter to the end portion of the rotary part; and FIG. 6 illustrates the structure of FIG. 5 subsequent to attachment of the first section of the adapter to the end portion of the rotary part.

DESCRIPTION OF PREFERRED EMBODIMENTS

The improved device is an adapter including a tubular first section 1, a tubular second section 2, a breakable joint 7 which connects the sections 1, 2 to each other, and a destructible barrier in the form of a flat diaphragm 6 extending across the internal passage of the section 1 adjacent the joint 7. The entire adapter is or can be made of a suitable plastic material in such a way that the joint 7 is of one piece with the sections 1 and 2. The section 1 has a hexagonal internal surface 3 which extends from the free end of this section close to the barrier 6, and a largely cylindrical external surface 1a which is devoid of any disengaging tool accommodating means. In other words, the surface 1a is selected in such a way that it cannot be readily engaged by a wrench or by another standard tool for the purpose of rotating the section 1 and the end portion or head 13 of a rotary part 11 of the type shown in FIGS. 5 and 6. The illustrated surface 1a includes a cylindrical portion adjacent the free end of the section 1, a slightly conical portion adjacent the cylindrical portion, a substantially radial shoulder 8 adjacent the slightly conical portion and a more pronounced conical portion 9 adjacent the section 2. The radius of curvature of gradual transition from the shoulder 8 into the more pronounced conical portion 9 of the external surface 1a is indicated at R.

The second section 2 of the improved adapter has a polygonal (normally hexagonal) external surface 4 which can be readily engaged by a suitable wrench or by another torque transmitting tool to apply to the section 2 a preselected torque at which the joint 7 is destroyed so that the section 2 becomes separated from the section 1. The preselected torque is effective to entail a destruction of the joint 7 when the externally threaded shank or stem 12 of the rotary part 11 offers a predetermined resistance to further penetration into an object or to further displacement relative to one or more objects. The section 2 may but need not be provided with an axial passage 5, and the passage may but need not be bounded by a non-circular surface (in lieu of the illustrated cylindrical internal surface) so as to enable a different torque transmitting tool to engage and rotate the sections 1, 2, until the joint 7 is destroyed, by introducing the working end of such tool into the passage 5. If provided, the passage 5 affords access to the barrier 6 in the section 1.

The barrier 6 can have a negligible thickness, e.g., in the range of a fraction of one millimeter (for example, 0.3 mm) so that it can be readily destroyed by the working end of a screw driver, by a wrench or by any other suitable implement, particularly upon destruction of the joint 7 so that the barrier 6 is accessible at that end of the section 1 which was previously of one piece with the section 2.

The adapter is or can be relatively small. For example, the size of an adapter of the type shown in FIGS. 1 to 3 can be approximately five times the actual size of a mass produced adapter.

The joint 7 is surrounded by a pronounced circumferentially complete groove which is bounded by two mutually inclined surfaces, namely a radially extending shoulder 10 of the second section 2 and the aforementioned pronouncedly conical portion 9 of the external surface 1a of the first section 1. The shoulder 10 and the conical portion 9 of the surface 1a make an acute angle alpha (see particularly FIG. 4), e.g., an angle in the range of 70°. The just described configuration of the surfaces bounding the groove around the joint 7 ensures that the joint breaks at the shoulder 10, i.e., at a predetermined location close to the barrier 6 in the axial passage of the section 1. Exact advance determination of the locus of break between the sections 1 and 2 is desirable and advantageous because this ensures that the barrier 6 is not damaged or destroyed when the joint 7 breaks and also that the barrier 6 is close to the respective end of the section 1 as soon as the section 2 is detached so that the barrier 6 can be readily engaged and at least partially destroyed or removed by a readily available tool or implement.

The rotary part 11 which is illustrated in FIGS. 5 and 6 is a screw having the aforementioned external threaded shank or stem 12 and the end portion or head 13 including a frustoconical portion 13a of one piece with the shank 12 and a second portion 14 which is of one piece with the frustoconical portion 13a. The portion 14 has a polygonal (e.g., hexagonal) external surface 16 which can be non-rotatably received in the passage surrounded by the internal surface 3 of the section 1, and a diametrically extending slot 15 bounded by an internal surface which can be engaged by the working end of a screw driver or another suitable tool.

When the adapter of FIGS. 1 to 3 is to be put to use, it is moved from the position of FIG. 5 to the position of FIG. 6 so that the internal surface 3 of the section 1 non-rotatably engages the external surface 16 of portion 14 of the end portion or head 13 of the rotary part 11. This ensures that the rotary part 11 must share the angular movements of the adapter. The adapter is then rotated by a tool (not shown) which engages the polygonal external surface 4 and/or the internal surface bounding the passage 5 of the section 2, and the section 2 continues to transmit torque to the rotary part 11 through the section 1 as long as the joint 7 remains intact. When the joint 7 breaks in response to the application of a preselected torque to the section 2, the latter becomes separated from the section 1 and the barrier 6 is exposed. It is desirable to coat the internal surface 3 in the section 1 and/or the external surface 16 with a suitable adhesive which bonds the section 1 to the end portion or head 13 so that the section 1 is not separable from the end portion 13 when the destruction of the joint 7 is completed. This ensures that an unauthorized person cannot simply slip the section 1 off the portion 14 of the head 13 and to thereupon employ a tool in order to engage the external surface 16 and/or the internal surface bounding the slot 15 and rotate the rotary part 11 relative to the object or objects which are engaged by the externally threaded shank 12. Instead, the slot 15 is accessible only upon destruction of the barrier 6 (e.g., with the working end of a screw driver) so that the slot 15 can be reached from that end of the section 1 which was of one piece with the section 2.

The means for applying a preselected torque to the rotary part 11 for the purpose of driving the rotary part home and of destroying the joint 7 can include an end wrench or spanner, a box wrench or a wrench with an exchangeable working end, as long as the selected tool can properly engage the polygonal external surface 4 and/or the internal surface of the section 2. The preselected torque is selected with a view to ensure that the rotary part 11 is driven home or is otherwise applied with a predetermined force, e.g., to properly secure a hose clamp which is to connect a nipple or another tubular part to one end of a flexible hose or the like.

As already mentioned above, an observer of the adapter (or more specifically of the remnant of the adapter on the rotary part 11) can ascertain at a glance that the rotary part 11 was driven home in response to the application of a preselected torque (because the joint 7 is destroyed and the section 2 is no longer of one piece with the section 1 (or the section 2 cannot be found at all). Furthermore, a person looking at the remnant of the improved adapter can ascertain whether or not the rotary part 11 was tampered with subsequent to separation of the section 2 from the section 1. This can be ascertained by looking at the barrier 6; if the barrier is intact, the rotary part 11 was not rotated subsequent to separation of the section 2 from the section 1.

The condition of the adapter and of the rotary part 11 can be ascertained even more readily if the sections 1, 2 are of different colors and/or if the barrier 6 and the other portions of the section 1 are differently colored. Thus, a person wishing to inspect the condition of the rotary part 11 must merely look for a certain color (of the section 2) in order to ascertain whether or not the section 2 is still of one piece with the section 1 (i.e., whether or not the rotary part 11 was driven home in response to the application of a preselected torque), and the condition (integrity or lack of integrity) of the barrier 6 can be even more readily ascertained if the color or hue of this barrier departs from the color or colors of the other portions of the section 1.

Once the section 2 is separated from the section 1, the portion 14 of the rotary part 11 can be reached only upon destruction of the barrier 6 or upon separation of the section 1 from the portion 14. However, and since the external surface 1a of the section 1 is conical and/or cylindrical, it cannot be readily grasped by a disengaging tool. If a tool has been used to remove the section 1 from the portion 14 of the rotary part 11, the external surface 1a will exhibit marks which are indicative or suggestive of tampering or attempted tampering. Furthermore, the section 1 is preferably bonded to the portion 14 so that they cannot be separated from each other once the applied bonding agent is permitted to set. In other words, the only way to gain access to the slot 15 of the portion 14 is to destroy the barrier 6 which, in turn, is indicative of tampering with the rotary part 11 subsequent to separation of the section 2 from the section 1 of the improved adapter. Alternatively, destruction of the barrier 6 can be resorted to by an authorized person who must gain access to the slot 15 in order to loosen or tighten the rotary part 11.

If the separation or section 2 from the section 1 has taken place in the plant in which the rotary part 11 was driven home or was otherwise applied in response to the application of a preselected torque, any damage to the barrier 6 is indicative of tampering with the rotary part 11 subsequent to removal of the rotary part 11 from the plant. Therefore, a person claiming damage or injury due to alleged application of insufficient torque to the rotary part 11 is not likely to prevail in the event of a dispute with the owner of the plant or establishment in which the joint 7 between the sections 1 and 2 of the improved adapter was destroyed. This can be of importance to the makers of automotive vehicles if the adapter is used to driven home a screw under the hood of or elsewhere in a motor vehicle.

The step of adhesively bonding the internal surface of the section 1 to the external surface of the end portion or head 13 of the rotary part 11 can be omitted if the section 1 is made of one piece with the end portion 13. This can be achieved by resorting to an extrusion or injection molding technique in order to turn out rotary parts which are of one piece with sections 1, 2 and the sections 2 are separable from the sections 1 in response to the application of a preselected torque, all as already described hereinabove.

It is further possible to establish a practically non-separable connection between a section 1 and the head of a screw or another rotary part by establishing a press fit or another pronounced fit which does not permit separation of the section 1 from the head 13 of a rotary part. For example, the section 1 can be shrunk onto the portion 14 of a head 13 to thus ensure that the resulting connection is permanent even though the section 1 is not adhesively bonded to the rotary part.

Prior to the making of the improved adapter in an extruding or another suitable machine for the purpose of making the section 1 of one piece with or of shrinking the section 1 onto the head 13, the slot 15 is preferably filled with a suitable elastomeric material which prevents penetration of flowable plastic (the presently preferred material for the making of the adapter) into the slot 15. However, the elastomeric insert which fills the slot 15 does not prevent the insertion of the working end of a screw driver or another suitable tool for the purpose of rotating the part 11 subsequent to separation of section 2 from the section 1 and following destruction of the barrier 6 which affords access to the slot 15.

It is further possible to replace the slot 15 with a non-circular socket in the end face of the portion 14 or to employ the slot 15 in combination with a second slot extending at right angles to the illustrated slot 15. The portion 14 then exhibits a cruciform recess for reception of the working end of a standard screw driver or for reception of a specially designed (complementary cruciform) working end of a torque transmitting tool which is to be used to turn the part 11 subsequent to at least partial destruction of the barrier 6. A rotary part whose end portion is provided with a cruciform slot or a like recess for reception of a torque transmitting tool can constitute a castellated nut. Thus, the rotary part which is to be rotated by resorting to the improved adapter need not always be provided with an external thread but can also exhibit an internal thread.

An important advantage of the improved device is that the tampering or absence of tampering with the rotary part can be immediately and reliably ascertained even by an unskilled or semiskilled person. All that is necessary is to ascertain the presence or absence of the section 2 (this indicates whether or not the rotary part was driven home in response to the application of a prescribed (preselected) torque and to observe the condition of the barrier 6 (and, if necessary or desired, the condition of the external surface 1a of the section 1); this enables the observer to ascertain whether or not the rotary part (such as the illustrated screw 11) has been tampered with (or whether or not an attempt to tamper with the rotary part was made) subsequent to separation of the section 2 from the section 1.

Another important advantage of the improved device is that an authorized person can readily gain access to the slot 15 or an analogous recess in the end portion 14 of a rotary part by the simple expedient of destroying the barrier 6.

A further important advantage of the improved device is that the location of the joint 7 is defined with a requisite degree of accuracy so that the separation of the section 2 from the section 1 takes place close to the barrier 6 but the latter is not destroyed or damaged as a result of separation of the sections 1 and 2 from each other.

An additional advantage of the improved device is that the sections 1 and 2 can be made of one piece. This reduces the cost of the adapter and simplifies storage of unused adapters in an automobile assembling plant or in any other establishment which employs the improved adapter. However, it is equally within the purview of the invention to establish between the sections 1 and 2 a joint which is not of one piece with the section 1 and/or with the section 2, as long as the joint permits separation of the section 2 from the section 1 upon completed application of preselected torque to a rotary part which receives torque from the section 1.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A device for applying a preselected torque to a rotary part having an end portion with a surface engageable by a torque transmitting tool, comprising an adapter including a tubular first section non-rotatably surrounding the end portion and having an external surface devoid of any disengaging tool accommodating means; a second section adjacent said first section and having a surface engageable by a torque transmitting tool; a joint connecting said sections and permitting separation of said sections from each other in response to the application of said preselected torque to said second section; and a destructible barrier provided in said first section between the end portion and said joint, wherein said barrier includes a diaphragm which is penetrable by an implement to afford access to the surface of the end portion.

2. The device of claim 1, wherein said joint is of one piece with said sections.

3. The device of claim 1, wherein said adapter has an external groove surrounding said joint and bounded by mutually inclined external surfaces of said sections.

4. The device of claim 3, wherein said mutually inclined external surfaces make an acute angle.

5. The device of claim 1, wherein said first section is of one piece with the end portion.

6. The device of claim 1, wherein said first section is bonded to the end portion.

7. The device of claim 1, wherein said first section is in frictional engagement with the end portion.

8. The device of claim 1, wherein said barrier is of one piece with said first section.

9. The device of claim 1, wherein said adapter consists at least in part of a plastic material.

10. The device of claim 1, wherein said surface of said second section is a polygonal external surface.

11. The device of claim 1, wherein said external surface of said first section is an at least partly cylindrical surface.

* * * * *